United States Patent
Ogawa

(10) Patent No.: US 7,085,586 B2
(45) Date of Patent: Aug. 1, 2006

(54) MULTI-BAND RADIO TERMINAL AND BAND SWITCHING METHOD USED THEREFOR AND PROGRAM THEREOF

(75) Inventor: Ryutaro Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 313 days.

(21) Appl. No.: 10/790,741

(22) Filed: Mar. 3, 2004

(65) Prior Publication Data

US 2004/0204039 A1   Oct. 14, 2004

(30) Foreign Application Priority Data

Mar. 5, 2003   (JP) .............................. 2003-057891

(51) Int. Cl.
*H04M 1/00* (2006.01)
(52) U.S. Cl. .................. 455/552.1; 455/553.1
(58) Field of Classification Search ............. 455/552.1, 455/553.1, 420, 435.2
See application file for complete search history.

(56) References Cited

U.S. PATENT DOCUMENTS 5,915,223 A   6/1999  Lecuyer et al.

6,223,053 B1 * 4/2001 Friedmann et al. ...... 455/552.1
6,957,081 B1 * 10/2005 Leyh et al. .............. 455/553.1

FOREIGN PATENT DOCUMENTS

| EP | 0 966 241 A1 | 4/2000 |
|----|--------------|--------|
| EP | 1 006 669 A1 | 6/2000 |
| EP | 1006669 A1   | 6/2000 |
| JP | 11-251951 A  | 9/1999 |

* cited by examiner

*Primary Examiner*—Nick Corsaro
*Assistant Examiner*—Sayed T. Zewari
(74) *Attorney, Agent, or Firm*—Sughrue Mion, PLLC

(57) ABSTRACT

A frequency control unit derives a frequency corresponding to each FID from frequency information sent from a host sequence and sends the frequency information to a register conversion unit, the register conversion unit converts the frequency information sent from the frequency control unit into a register value and sends the register value to a three wire serial signal generation unit, the three wire serial signal generation unit simultaneously sends out the same data with the register value as a three wire serial signal of data, clock and strobe to a radio transmitter and receiver unit, and the radio transmitter and receiver unit controls ON/OFF by its own circuit in response to the three wire serial signal and transmits and receives radio waves of a set frequency through an antenna.

15 Claims, 5 Drawing Sheets

FIG. 2

| FID | FREQUENCY | |
|---|---|---|
| 1 | 800 | ⎫ |
| 2 | 801 | |
| 3 | 802 | |
| 4 | 803 | ⎬ Band#1 |
| 5 | 804 | |
|  |  | |
|  |  | |
|  |  | ⎭ |
| 100 | 1900 | ⎫ ← FORMAT OF DATA COMBINED INTO ONE |
| 101 | 1901 | |
| 102 | 1902 | |
| 103 | 1903 | |
| 104 | 1904 | ⎬ Band#2 |
|  |  | |
|  |  | |
|  |  | ⎭ |

24a

MULTI-BAND RADIO TERMINAL AND BAND SWITCHING METHOD USED THEREFOR AND PROGRAM THEREOF

BACKGROUND OF THE INVENTION

1. Field of the Invention

The present invention relates to a multi-band radio terminal and a band switching method used therefor and a program thereof and, more particularly, a band switching method at a radio portable terminal adaptable to multi-band.

2. Description of the Related Art

In recent years, more and more multi-band-adaptable radio portable terminals have been produced. In Japan, dual-band terminals adapted to 800 MHz band (PDC: Personal Digital Cellular) and 1.9 GHz band (PHS: Personal Handyphone System) have been already put on the domestic market and other multi-band terminals having more varieties of frequency bands are expected to be produced hereafter.

Example of a structure of the above-described dual-band terminal is shown in FIG. 5. In FIG. 5, the dual-band terminal includes an antenna (ANT#1) 110 and a Band (#1) adaptation unit 150 adaptable to a band #1 as a first band, an antenna (ANT#2) 120 and a Band (#2) adaptation unit 160 adaptable to a band #2 as a second band, a band switching unit 170 and a host sequence 130.

The Band (#1) adaptation unit 150 includes a radio transmitter and receiver unit 151, a three wire serial signal generation unit 152, a register conversion unit 153, a frequency control unit 154 and frequency setting data 155.

The Band (#2) adaptation unit 160 includes a radio transmitter and receiver unit 161, a three wire serial signal generation unit 162, a register conversion unit 163, a frequency control unit 164 and frequency setting data 165.

The band switching unit 170 controls the radio transmitter and receiver units 151 and 161 and the frequency control units 154 and 164 in response to an instruction from the host sequence 130 to operate either the antenna (ANT#1) 110 and the Band (#1) adaptation unit 150 or the antenna (ANT#2) 120 and the Band (#2) adaptation unit 160, thereby switching a band (see Japanese Patent Laying-Open (Kokai) No. Heisei 11-251951, for example).

In the above-described conventional dual-band terminal, since all control for band switching and setting of a frequency is performed by a control unit (CPU: central processing unit), operation of a control unit (CPU) becomes very complicated.

SUMMARY OF THE INVENTION

An object of the present invention is accordingly to provide a multi-band radio terminal solving the above-described problem and enabling band switching control to be facilitated without increasing load on a control unit (CPU), and a band switching method for use in the terminal and a program thereof.

According to the first aspect of the invention, a multi-band radio terminal which includes a plurality of radio units corresponding to each bands and is capable of using the plurality of frequency bands, comprises a control unit which adds band switching information to frequency information that comes from a host device to designate a frequency contained in the frequency band and transmits the obtained information to the radio unit, wherein the plurality of radio units control ON/OFF according to the band switching information.

According to another aspect of the invention, a band switching method of a multi-band radio terminal which includes a plurality of radio units corresponding to each bands and is capable of using the plurality of frequency bands, comprises a step of a control unit of transmitting band switching information to the radio unit based on frequency information that comes from a host device to designate a frequency contained in the frequency band and, a step of the plurality of radio units of controlling ON/OFF according to the band switching information.

According to another aspect of the invention, a control program executed on a multi-band radio terminal which includes a plurality of radio units corresponding to each bands and is capable of using the plurality of frequency bands to control switching of a frequency band, comprises a function of a control unit of transmitting band switching information to the radio unit based on frequency information that comes from a host device to designate a frequency contained in the frequency band, and a function of the plurality of radio units of controlling ON/OFF according to the band switching information.

More specifically, the multi-band radio terminal of the present invention enables band switching without requiring a new band switching unit by adding band switching information to a frequency setting serial signal.

By combining frequency setting data required for each band into one, the multi-band radio terminal of the present invention also enables two radio units to appear to be one from a control unit (CPU: central processing unit) side.

Since in the multi-band terminal of the present invention, a usable frequency varies with a band, a radio unit by itself determines a radio unit to be used based only on the frequency information and the control unit (CPU) conducts only the setting of a frequency. As a result, the multi-band radio terminal of the present invention enables the control unit (CPU) to handle a plurality of radio units as a radio unit having a large band width, thereby facilitating band switching control.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is a diagram showing arrangement of frequency setting data shown in FIG. 1;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Next, embodiments of the present invention will be described with reference to the drawings.

Figure 1:
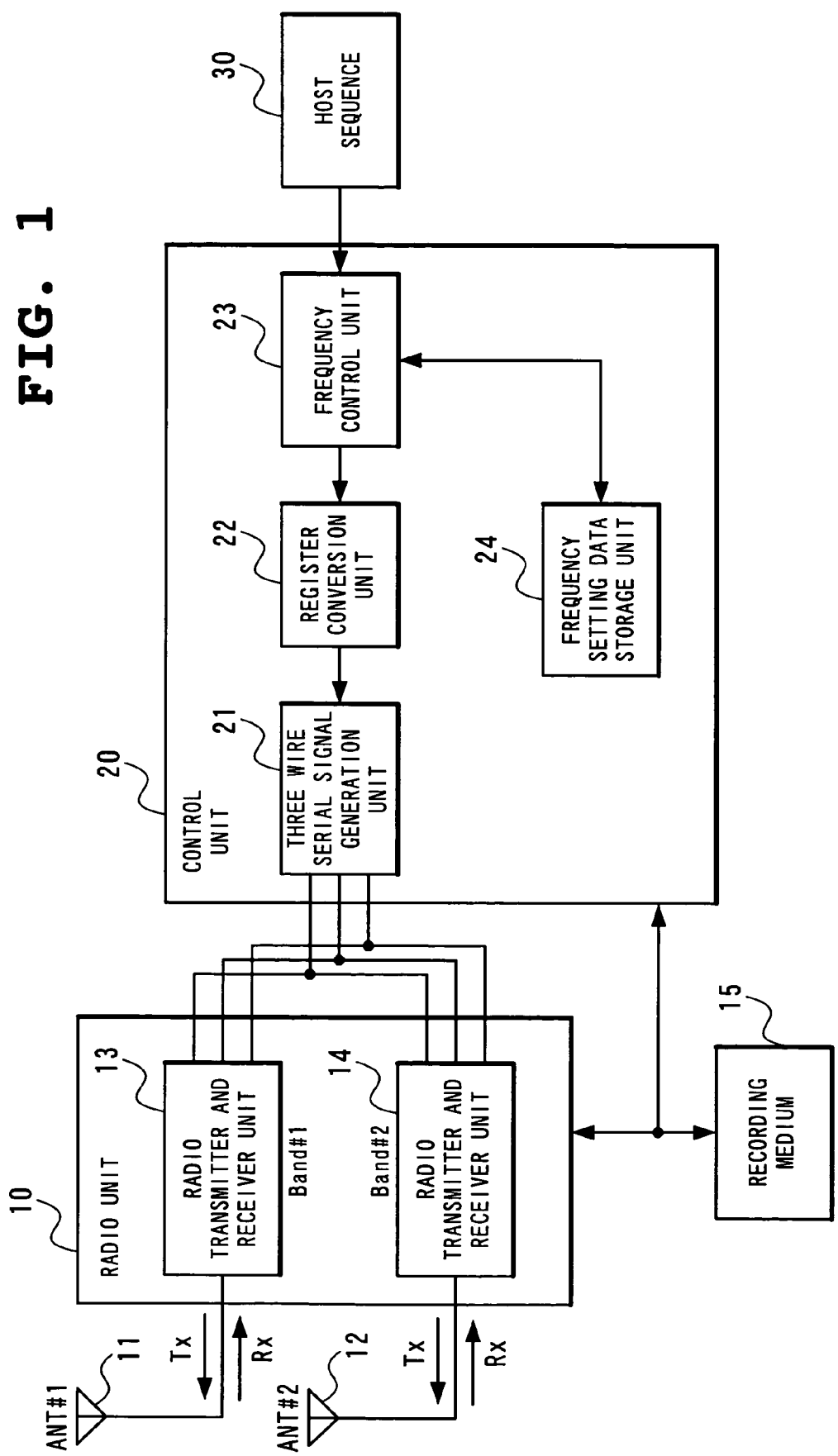
FIG. 1 is a block diagram showing a structure of a dual-band radio terminal according to one embodiment of the present invention.

FIG. 1 is a block diagram showing a structure of a dual-band radio terminal according to one embodiment of the present invention. The dual-band radio terminal according to the one embodiment of the present invention is designed to be capable of using two kinds of frequency bands and when a first band A and a second band B exist as the two kinds of frequency bands, for example, if switching should be made from the band A to the band B, band switching is conducted in response to a frequency setting serial signal and each of two radio units determines by itself which of the radio units is to be used.

This method is applicable also to a multi-band radio terminal having a plurality of bands to be switched. Setting, at a radio transmitter and receiver unit, a command for controlling an antenna switch (ANT SW) in response to ON/OFF of radio transmission and reception also enables antenna switch control to be executed only by the radio unit without using a control unit (CPU).

In FIG. 1, the dual-band radio terminal according to the one embodiment of the present invention includes a host sequence unit 30 as a host device which conducts data transmission and reception through the dual-band radio terminal in question, a control unit (CPU) 20, a radio unit 10 having radio transmitter and receiver units (TRX) (Band#1, Band#2) 13 and 14, antennas (ANT#1, ANT#2) 11 and 12 and a recording medium 15 which stores a radio control program executable by a computer.

The control unit 20 includes a frequency control unit 23, a register conversion unit 22, a three wire serial signal generation unit 21 and a frequency setting data storage unit 24 for storing frequency setting data 24a. The control unit 20 and the radio transmitter and receiver unit (Band#1) 13 and the radio transmitter and receiver unit (Band#2) 14 are structured to be capable of executing the radio control program stored in the recording medium 15.

In the control unit 20, frequency information (FID: Frequency Identifier) sent from the host frequency 30 is received at the frequency control unit 23. The frequency control unit 23 derives a frequency corresponding to each FID and sends the frequency information to the register conversion unit 22.

The register conversion unit 22 converts the frequency information sent from the frequency control unit 23 into a register value and sends the obtained register value to the three wire serial signal generation unit 21. The three wire serial signal generation unit 21 is structured to simultaneously transmit the same data of the sent register value as a three wire serial signal composed of data, clock and strobe to the radio transmitter and receiver unit (Band#1) 13 and the radio transmitter and receiver unit (Band#2) 14.

Upon reception of the three wire serial signal, the radio transmitter and receiver unit (Band#1) 13 and the radio transmitter and receiver unit (Band#2) 14 of the radio unit 10 control ON/OFF by themselves and transmit and receive radio waves of a set frequency through the antennas (ANT#1, ANT#2) 11 and 12. Although setting of a frequency should be conducted individually by a transmitter (TX) and a receiver unit (RX), the setting is described as being made in the lump in the present embodiment. The radio transmitter and receiver unit (Band#1) 13 corresponds to the Band#1 and the radio transmitter and receiver unit (Band#2) 14 corresponds to the Band#2.

FIG. 2 is a diagram showing an example of arrangement of the frequency setting data 24a of the frequency setting data storage unit 24 illustrated in FIG. 1.

In FIG. 2, the frequency setting data 24a has a data format including as being combined into one, data of the Band#1 in which FID "1", "2", "3", "4" and "5" and frequencies "800", "801", "802", "803" and "804" are stored corresponding to each other and data of the Band#2 in which FID "100", "101", "102", "103" and "104" and frequencies "1900", "1901", "1902", "1903" and "1904" are stored corresponding to each other. Here, a unit of a frequency is MHz.

Data is sent to the register conversion unit 22 with "0" added to the end of the data when sending out the frequency setting data 24a of the Band#1 and with "1" added to the end of the data when sending out the frequency setting data 24a of the Band#2.

Figure 3:
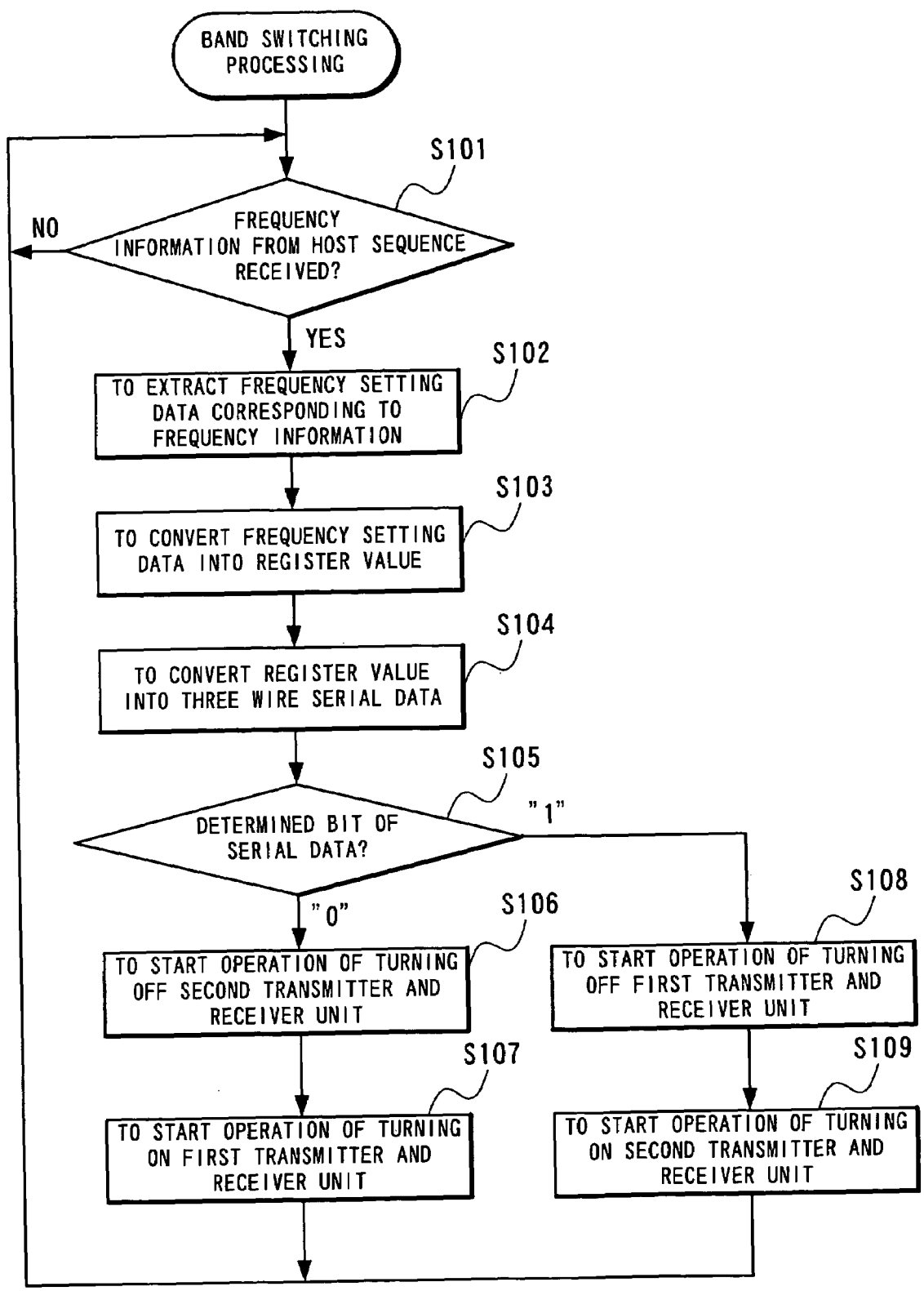
FIG. 3 is a flow chart showing operation of the dual-band radio terminal according to the one embodiment of the present invention.

FIG. 3 is a flow chart showing operation of the dual-band radio terminal according to the one embodiment of the present invention. With reference to FIGS. 1 to 3, description will be made of operation of the dual-band radio terminal according to the one embodiment of the present invention. The processing shown in FIG. 3 is realized by the execution of the program in the storage medium 15 by the control unit 20 and the radio transmitter and receiver unit (Band#1) 13 and the radio transmitter and receiver unit (Band#2) 14. In FIG. 3, the radio transmitter and receiver unit (Band#1) 13 is represented as the first transmitter and receiver unit and the radio transmitter and receiver unit (Band#2) 14 is represented as the second transmitter and receiver unit.

Assume that the dual-band radio terminal using the Band#1 has its band switched for using the Band#2. In this case, while using the Band#1, the radio transmitter and receiver unit (Band#1) 13 is started and the radio transmitter and receiver unit (Band#2) 14 is at an OFF state in the radio unit.

At the time of switching a band, frequency information FID corresponding to the frequency of the Band #2 is sent from the host sequence unit 30 to the frequency control unit 23 (Step S101 in FIG. 3). Since the frequency control unit 23 has the frequency setting data 24a corresponding to each frequency information FID, frequency setting data corresponding to the transmitted frequency information FID is extracted (Step S102 in FIG. 3).

At this time, the frequency setting data, whose format is the same in the Band#1 and the Band#2, is stored in the lump and with respect to the frequency setting data of the Band#1, for example, add "0" to the end of the bit without fail and with respect to the frequency setting data of the Band#2, add "1" to the end of the bit without fail (see FIG. 2).

On the occasion of band switching, the control unit 20 should perform only switching operation of frequency. When changing from the radio transmitter and receiver unit (Band#1) 13 in use to the radio transmitter and receiver unit (Band#2) 14, the control unit 20 does not need to perform operation for turning off of the radio transmitter and receiver unit (Band#1) 13, turning on of the radio transmitter and receiver unit (Band#2) 14, and a frequency setup of the radio transmitter and receiver unit (Band#2) 14.

The frequency control unit 23 sends the extracted data to the register conversion unit 22. The register conversion unit 22 converts the transmitted data into a register value (Step S103 in FIG. 3) and sends out the value to the three wire serial signal generation unit 21. The three wire serial signal generation unit 21 converts the transmitted register value into a three wire serial signal (Step S104 in FIG. 3) to simultaneously send out the same data to the radio transmitter and receiver unit (Band#1) 13 and the radio transmitter and receiver unit (Band#2) 14. Assume at this time that the data sent from the three wire serial signal generation unit 21 has "1" (Band#2) as the last bit.

The radio transmitter and receiver unit (Band#1) 13 and the radio transmitter and receiver unit (Band#2) 14 simultaneously obtain the same serial data and since the data sent this time has "1" as the last bit, the radio transmitter and receiver unit (Band#1) 13 detects the bit, while starting operation of turning off its own circuit (Steps 105 and S108 in FIG. 3). At the same time, the radio transmitter and receiver unit (Band#2) 14 starts operation of turning on its own circuit (Step S109 in FIG. 3). Completion of the operation is regarded as completion of band switching.

Assuming that the last bit of the data sent from the three wire serial signal generation unit 21 is "0" (Band#1), the radio transmitter and receiver unit (Band#1) 13 and the radio transmitter and receiver unit (Band#2) 14 simultaneously obtain the same serial data and since the data sent this time has "0" as the last bit, the radio transmitter and receiver unit (Band#2) 14 detects the bit, while starting operation of turning off its own circuit (Steps 105 and S106 in FIG. 3). At the same time, the radio transmitter and receiver unit (Band#1) 13 starts operation of turning on its own circuit (Step S107 in FIG. 3). Completion of the operation is regarded as completion of band switching.

As described in the foregoing, since a usable frequency varies with each radio transmitter and receiver unit in the present embodiment, the radio transmitter and receiver unit (Band#1) 13 and the radio transmitter and receiver unit (Band#2) 14 by themselves determine which of the radio transmitter and receiver unit (Band#1) 13 and the radio transmitter and receiver unit (Band#2) 14 is to be used based only on the frequency information, while the control unit 20 conducts only the frequency setting.

This arrangement enables the control unit 20 to handle a plurality of the radio transmitter and receiver unit (Band#1) 13 and the radio transmitter and receiver unit (Band#2) 14 as if they were one radio unit having a large band width in the present embodiment, so that band switching can be controlled with ease.

Figure 4:
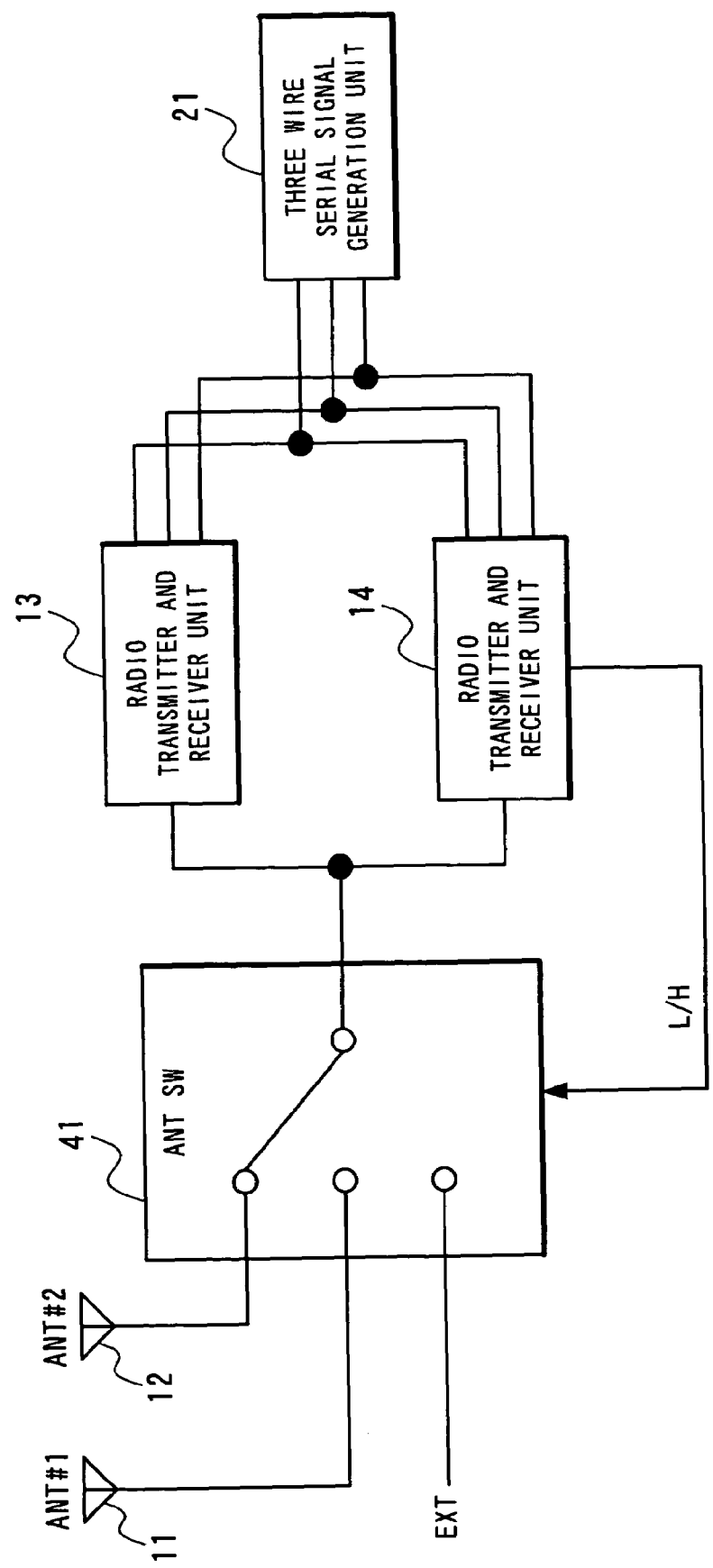
FIG. 4 is a block diagram showing an example of a partial structure of a dual-band radio terminal according to another embodiment of the present invention.
Figure 5:
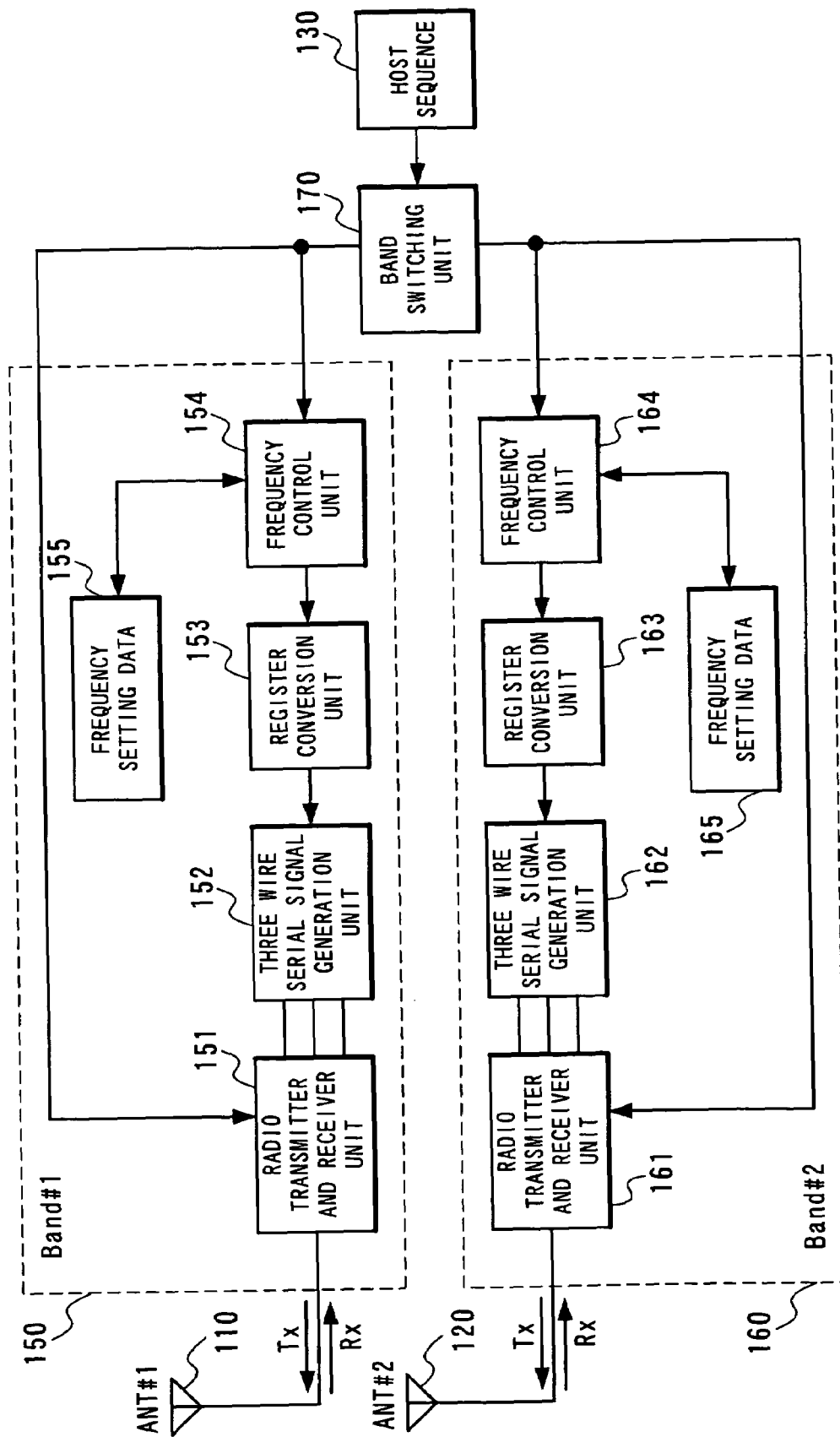
FIG. 5 is a block diagram showing a structure of a conventional dual-band radio terminal.

FIG. 4 is a block diagram showing an example of a partial structure of a dual-band radio terminal according to another embodiment of the present invention.

In FIG. 4, the dual-band radio terminal according to another embodiment of the present invention is structured to have an antenna switch (ANT SW) 41 for switching the antennas (ANT#1, ANT#2) 11 and 12 disposed between the antennas (ANT#1, ANT#2) 11 and 12 and the radio transmitter and receiver unit (Band#1) 13 and the radio transmitter and receiver unit (Band#2) 14. The remaining part of the structure is the same as that of the dual-band radio terminal according to the one embodiment of the present invention shown in FIG. 1 and the same components are allotted the same reference numerals.

In the dual-band radio terminal according to another embodiment of the present invention, setting switching logic of the antenna switch 41 to be linked with ON/OFF of the radio transmitter and receiver unit (Band#1) 13 and the radio transmitter and receiver unit (Band#2) 14 enables the antenna switch 41 to be controlled without using the CPU unit 20.

The example shown in FIG. 4 is structured to have the antenna switch 41 be switched in linkage with ON/OFF of the radio transmitter and receiver unit 14, in which when the radio transmitter and receiver unit 14 is ON, the antenna switch 41 is switched to the antenna (ANT#2) 12 side and when the radio transmitter and receiver unit 14 is OFF, it is switched to the antenna (ANT#1) 11 side.

The terminal may be as a matter of course structured to have the antenna switch 41 be switched in linkage with ON/OFF of the radio transmitter and receiver unit 13.

Although the above-described one embodiment and another embodiment of the present invention have been described with respect to a dual-band radio terminal, the above-described method is applicable not only to a dual-band radio terminal but also to a multi-band radio terminal and not limited to the same.

As described in the foregoing, having thus-described structure and operation, the present invention produces the effect of facilitating band switching control without increasing load on a CPU.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A multi-band radio terminal which includes a plurality of radio units corresponding to each bands and is capable of using said plurality of frequency bands, comprising:
   a control unit which adds band switching information to frequency information that comes from a host device to designate a frequency contained in said frequency band and transmits the obtained information to said radio unit, wherein
   said plurality of radio units control ON/OFF according to said band switching information.

2. The multi-band radio terminal as set forth in claim 1, wherein
   said control unit adds the band switching information to said frequency information and transmits the obtained information to all said radio units.

3. The multi-band radio terminal as set forth in claim 1, wherein
   said control unit transmits a serial signal with band switching information which designates any of said plurality of frequency bands added to said frequency information to said plurality of radio units, and
   said radio unit determines on ON/OFF based on said band switching information contained in said serial signal.

4. The multi-band radio terminal as set forth in claim 3, wherein
   said control unit has, in the lump, frequency setting data which correlates said frequency information with a frequency in each band in said plurality of frequency bands, and extracts said frequency setting data corresponding to said frequency information and adds said band switching information to the extracted frequency setting data to transmit the obtained data to said radio unit.

5. The multi-band radio terminal as set forth in claim 1, including:
   a plurality of antennas each corresponding to each of said plurality of radio units, and an antenna switch which switches each of said plurality of antennas, wherein
   said antenna switch switches said plurality of antennas in linkage with on/off control of said plurality of radio units.

6. The multi-band radio terminal as set forth in claim 1, wherein said control unit includes:
   a storage unit which stores in the lump, frequency setting data which correlates said frequency information with a frequency in each band in said plurality of frequency bands,
   a frequency control unit which extracts said frequency setting data corresponding to said frequency information and adds said band switching information to the extracted frequency setting data, and
   a transmitter which converts said frequency setting data with said band switching information added into a serial signal and transmits the obtained signal to said radio unit.

7. A band switching method of a multi-band radio terminal which includes a plurality of radio units corresponding to each bands and is capable of using said plurality of frequency bands, comprising:
   a step of a control unit of transmitting band switching information to said radio unit based on frequency information that comes from a host device to designate a frequency contained in said frequency band and,
   a step of said plurality of radio units of controlling ON/OFF according to said band switching information.

8. The band switching method of a multi-band radio terminal as set forth in claim 7, wherein
   the band switching information is added to said frequency information and the obtained information is transmitted to all said radio units.

9. The band switching method of a multi-band radio terminal as set forth in claim 7, wherein
   said control unit transmits a serial signal with band switching information which designates any of said plurality of frequency bands added to said frequency information to said plurality of radio units, and
   said radio unit determines on ON/OFF based on said band switching information contained in said serial signal.

10. The band switching method of a multi-band radio terminal as set forth in claim 9, wherein
   said control unit has, in the lump, frequency setting data which correlates said frequency information with a frequency in each band in said plurality of frequency bands, and extracts said frequency setting data corresponding to said frequency information and adds said band switching information to the extracted frequency setting data to transmit the obtained data to said radio unit.

11. The band switching method of a multi-band radio terminal as set forth in claim 7, wherein
   an antenna switch which switches a plurality of antennas each corresponding to each of said plurality of radio units switches said plurality of antennas in linkage with on/off control of said plurality of radio units.

12. A control program executed on a multi-band radio terminal which includes a plurality of radio units corresponding to each bands and is capable of using said plurality of frequency bands to control switching of a frequency band, comprising:
   a function of a control unit of transmitting band switching information to said radio unit based on frequency information that comes from a host device to designate a frequency contained in said frequency band, and
   a function of said plurality of radio units of controlling ON/OFF according to said band switching information.

13. The control program which controls switching of a frequency band of a multi-band radio terminal as set forth in claim 12, comprising:
   a function of transmitting a serial signal with band switching information which designates any of said plurality of frequency bands added to said frequency information to said plurality of radio units, and
   a function of said radio unit of determining on ON/OFF based on said band switching information contained in said serial signal.

14. The control program which controls switching of a frequency band of a multi-band radio terminal as set forth in claim 13, wherein
   frequency setting data which correlates said frequency information with a frequency in each band in said plurality of frequency bands is held in the lump, and which further comprises:
   a function of extracting said frequency setting data corresponding to said frequency information and adding said band switching information to the extracted frequency setting data to transmit the obtained data to said radio unit.

15. The control program which controls switching of a frequency band of a multi-band radio terminal as set forth in claim 12, wherein
   an antenna switch which switches a plurality of antennas each corresponding to each of said plurality of radio units further includes a function of switching said plurality of antennas in linkage with on/off control of said plurality of radio units.

* * * * *